Dec. 9, 1958 J. M. MURPHY ET AL 2,863,300
REFRIGERATING APPARATUS
Filed Oct. 28, 1955 7 Sheets-Sheet 2
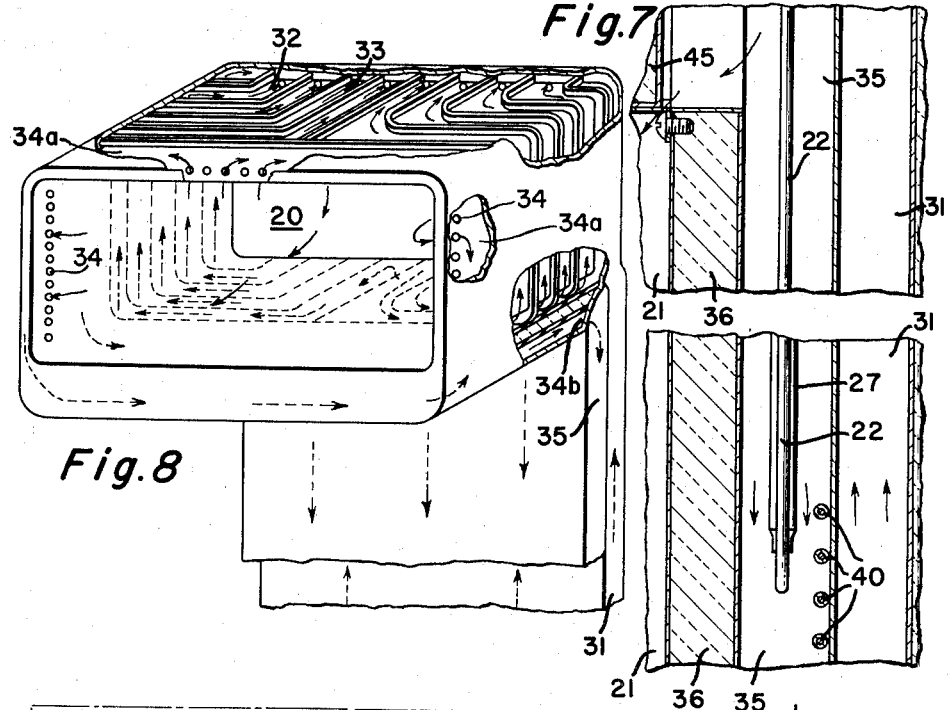
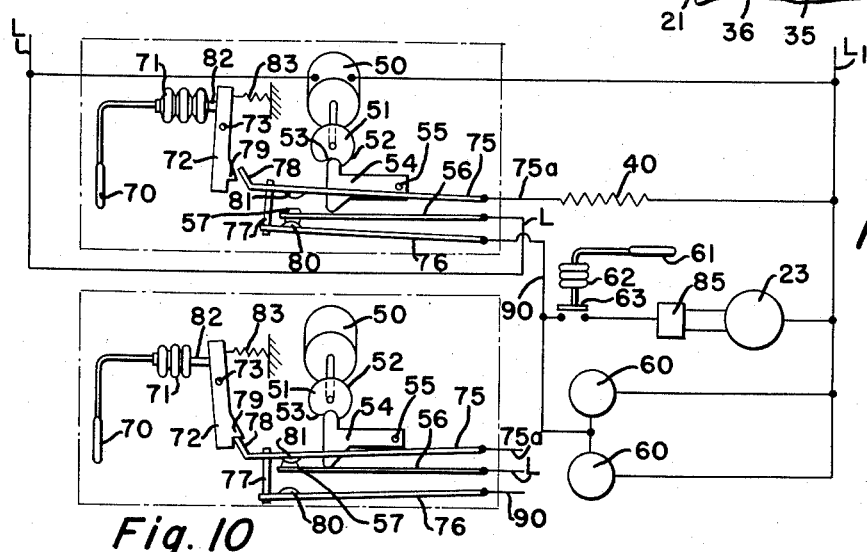
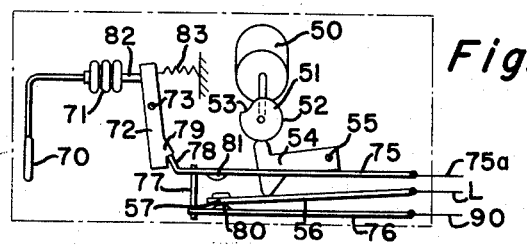
INVENTORS
John M. Murphy and
Leonard J. Mann
BY
*H. Strickland*
Their Attorney Dec. 9, 1958  J. M. MURPHY ET AL  2,863,300
REFRIGERATING APPARATUS
Filed Oct. 28, 1955  7 Sheets-Sheet 3

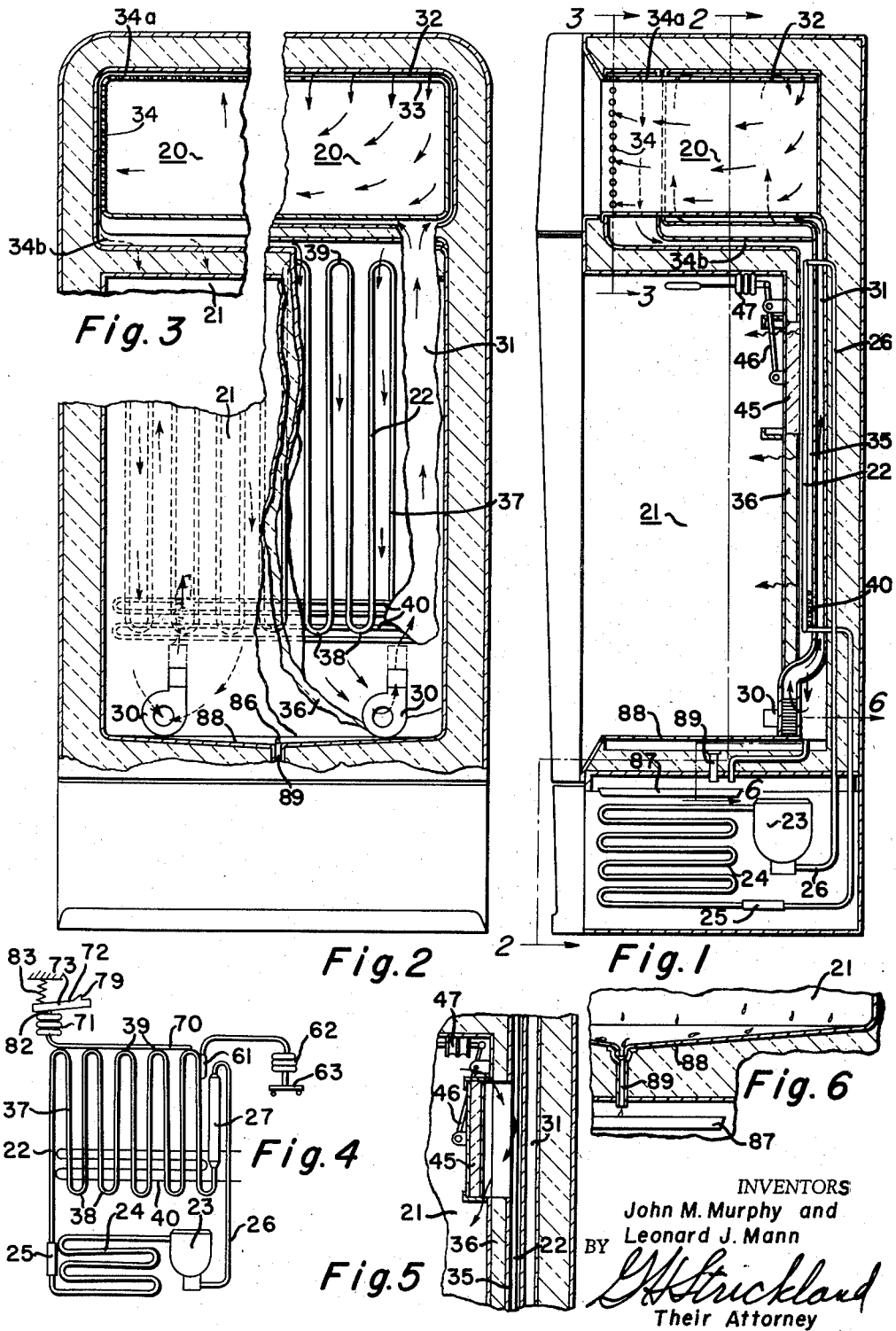

INVENTORS
John M. Murphy
Leonard J. Mann
BY
R. R. Cauder
Their Attorney

Dec. 9, 1958  J. M. MURPHY ET AL  2,863,300
REFRIGERATING APPARATUS
Filed Oct. 28, 1955  7 Sheets-Sheet 4

INVENTORS
John M. Murphy
BY Leonard J. Mann

Their Attorney

Dec. 9, 1958 J. M. MURPHY ET AL 2,863,300
REFRIGERATING APPARATUS
Filed Oct. 28, 1955 7 Sheets-Sheet 5

INVENTORS
John M. Murphy
Leonard J. Mann
BY
Their Attorney

Dec. 9, 1958   J. M. MURPHY ET AL   2,863,300
REFRIGERATING APPARATUS
Filed Oct. 28, 1955   7 Sheets-Sheet 6

INVENTORS
John M. Murphy
Leonard J. Mann
BY

Their Attorney

Dec. 9, 1958   J. M. MURPHY ET AL   2,863,300
REFRIGERATING APPARATUS

Filed Oct. 28, 1955   7 Sheets-Sheet 7

INVENTORS
John M. Murphy
Leonard J. Mann
BY
R R Caudor
Their Attorney

United States Patent Office 2,863,300
Patented Dec. 9, 1958

2,863,300

REFRIGERATING APPARATUS

John M. Murphy and Leonard J. Mann, Dayton, Ohio, assignors to General Motors Corporation, Detroit, Mich., a corporation of Delaware Application October 28, 1955, Serial No. 543,420

7 Claims. (Cl. 62—187)

Refrigerators at present have a freezing compartment and a higher temperature refrigerating compartment. Frost accumulates on the walls of the freezing compartment and on the food packages within such compartment. Defrosting operations are necessary periodically to remove such frost, and these require either manual scraping of the interior walls or heating of the walls to remove the frost. If heating is used, a coating of water is likely to be produced on the food packages, which later freezes the food packages together in the form of a block from which individual packages are very difficult to remove.

According to this invention, however, no frost is deposited either on the interior walls of the freezing compartment or on the food packages within such compartment. Moreover, any frost or ice which may have been introduced into the compartment either on newly inserted frozen food packages, or by reason of moist air admitted by the opening of the door, etc., is quickly sublimated out of the compartment, thus restoring the compartment to its fully frost-free condition. In the operation of a refrigerator embodying this invention, no periodic scraping or melting of the frost within the freezing compartment is necessary.

An object of this invention, therefore, is to provide a refrigerator having a freezing compartment and a higher temperature refrigerating compartment, in which no frost is deposited in the freezing compartment, and from which any frost or ice introduced therein is sublimated without the necessity of periodic scraping or melting of the frost.

Another object of this invention is to provide a refrigerator with a first liner forming a below freezing compartment, with a second liner forming an above freezing compartment, with means for refrigerating said above freezing compartment at temperatures approximately between 32° F. and 50° F. with means for cooling said first liner to a temperature below freezing temperature, with means for recirculating air into and out of said first liner, and with means outside of and out of contact with said liner for cooling said recirculating air below said below freezing temperature so that no frost is deposited by said recirculating air within said first liner, and whereby any frost or ice introduced therein is sublimated from said below freezing compartment.

Further objects and advantages of the present invention will be apparent from the following description, reference being had to the accompanying drawings wherein a preferred form of the invention is clearly shown.

In the drawings:

Figure 1 is a vertical cross-section of the refrigerator.

Figure 2 is a vertical cross-section transverse to Figure 1 taken along the line 2—2 of Figure 1 with parts broken away.

Figure 3 is a vertical cross-section of a portion of Figure 1 taken along the line 3—3 of Figure 1.

Figure 4 is a diagrammatic representation of the refrigerating system.

Figure 5 is a partial view of the rear wall of Figure 1, showing the damper 45 in a different position.

Figure 6 is a vertical cross-section taken along the line 6—6 of Figure 1.

Figure 7 is an enlarged cross-section of a portion of Figure 1.

Figure 8 is a view in perspective of the below freezing compartment.

Figure 9 is a wiring diagram for the apparatus of Figures 1 through 8.

Figures 10 and 11 show a portion of Figure 9 in different positions.

Figure 12:
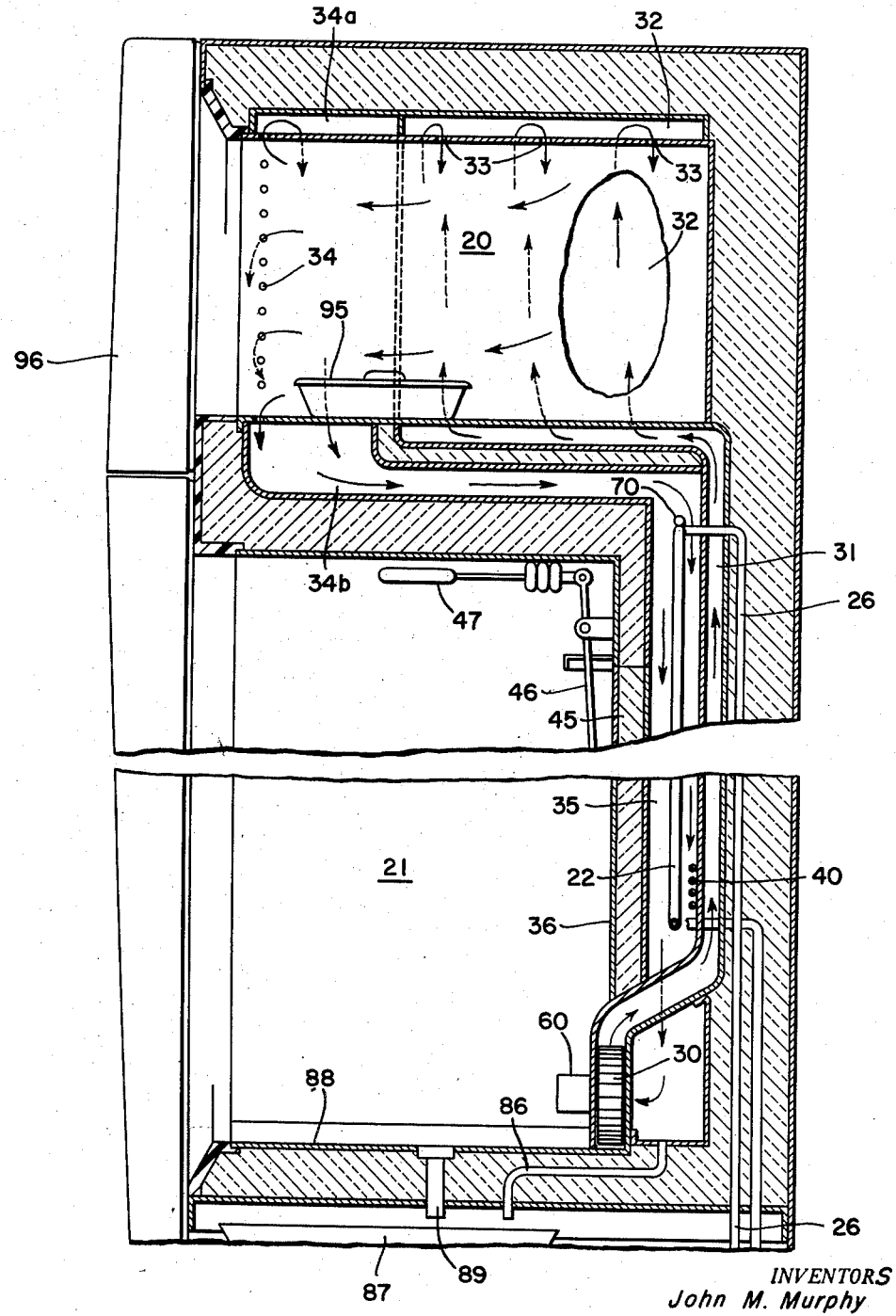
Figure 12 is an enlarged view of the upper and lower portions of Figure 1, with the central portion omitted.

A refrigerator, according to this invention, has a below freezing compartment 20 and a refrigerating, above freezing, compartment 21. A refrigeration system is provided, including a refrigerant evaporator 22 and a refrigerant liquefier in refrigerant circulating relationship with the evaporator 22. The liquefier may include a motor compressor unit 23 and a condenser 24. The liquefied refrigerant flows through the expansion valve or capillary tube 25 to the evaporator 22 and returns through the conduit 26 to the motor compressor unit 23.

If desired, the evaporator 22 may include an accumulator 27 to trap liquid refrigerant and prevent the return of slugs of liquid refrigerant to the compressor 23.

Air circulating means, in the form of one or more blowers 30, is provided. Conduit means for circulating air may include the up flow conduit 31 leading to the serpentine conduits 32 around the below freezing compartment 20. These serpentine conduits 32 discharge air into the compartment 20 through openings 33. The air from compartment 20 returns through openings 34 into the front, surrounding conduit 34a, and the horizontal, rearwardly directed flow conduit 34b, which discharges into the down flow conduit 35. The conduit 35 is in thermal exchange with the above freezing compartment 21 which is maintained at an above freezing temperature. The conduit 35 returns the air to the air circulating means or blowers 30.

The thermal exchange between the down flow conduit 35 and the compartment 21 may be through an insulated wall 36 having a thickness sufficient to reduce the temperature in compartment 21 substantially to the temperature desired under normal operating conditions. The evaporator 22 is placed in the down flow conduit 35, and preferably is in the form of vertical runs 37 joined by 180° bends 38 and 39. The evaporator 22 is placed a small distance from the insulated wall 36.

The circulated air is chilled by the evaporator 22 to a temperature below that to be maintained in compartment 20. Hence, the frost depositing temperature of the circulated air is also below the temperature in compartment 20. Frost is deposited only on evaporator 22, and none is deposited in either compartment 20 or compartment 21. These compartments never need defrosting, and the periodic defrosting of evaporator 22 has practically no effect on the food temperatures in these compartments.

Means are provided for periodically defrosting the evaporator 22 and this may take the form of a serpentine electric heater 40 in thermal exchange with the lower part of the evaporator 22. The heater 40 is energized periodically under the control of a timer hereafter described.

Means are provided for varying the thermal exchange of the circulated air with the above freezing compartment 21. This may take the form of a damper 45 which is moved rightward or leftward by the linkage 46 connected to a thermostat 47 responsive to the temperatures in the compartment 21. As the temperature in compartment 21 falls, the linkage 46 moves the damper 45 rightward and vice versa. The action of this construction is to maintain the temperature in compartment 21 within desired limits notwithstanding varying conditions of operation.

A defrost timer is provided having a motor 50 and a cam 51. The cam 51 has a large smooth cam surface 52 establishing a refrigerating period and a relatively small intended notch 53 establishing a defrost period. A pivoted follower 54 is fulcrumed at 55 and is urged upwardly by the upwardly biased contact blade 56 having double contacts 57. In general, when the smooth surface 52 engages the follower 54, a refrigerating period is established to permit the refrigerating system to produce refrigeration and the air circulating means to operate. In general, when the notch 53 is in engagement with the follower 54, a defrosting period is established which stops the refrigerating system from producing refrigeration, stops the air circulating means, and causes operation of the defrosting means. In addition, means are provided for changing the timer switch from a defrost position to a refrigeration position when the evaporator 22 has been defrosted prior to the expiration of the timed defrosting period, as will be more fully explained.

The air circulating means or blowers 30 are driven by one or more motors 60. A thermostatic bulb 61 is placed near the discharge end of the evaporator 22 and is connected to a bellows 62 which opens and closes the switch 63 as the temperatures in the evaporator 22 fall and rise respectively. The thermostatic bulb 61 tends to maintain the evaporator temperature at a substantially constant temperature within predetermined limits below the temperature selected for the compartment 20 by controlling the operation of the motor compressor 23. To this end, the thermostat 61, 62, 63 is responsive to evaporator temperatures and prevents operation of the motor compressor 23 when the temperature of the evaporator is below a predetermined low temperature and permits operation of the motor compressor when the temperature of said evaporator is above said low temperature.

Means are provided to terminate the defrost period when the defrosting operation has been completed even while the timer notch 53 is still in engagement with the follower 54. To this end, a thermostatic bulb 70 is placed in thermal exchange with the evaporator 22, preferably at the upper return bends 39 (Figure 4). The bulb 70 is connected to a bellows 71 which operates the lever 72 fulcrumed at 73. The thermostat 70, 71 and 72 has means automatically changing the defrost switch position of the timer into a refrigerating switch position in response to a predetermined high temperature in the evaporator 22, acting on the thermostatic bulb 70. This is accomplished by providing a pair of upwardly biased contact blades 75 and 76 (Figures 9, 10 and 11) tied together by the insulating spacer 77, and by providing a tongue 78 adapted to cooperate with the detent 79 of lever 72.

During the refrigerating period, as shown in Figure 11, the circumference 52 of cam 51 moves the follower 54 downward, to cause blade 56 also to be moved downward. The double contacts 57 engage the contact 80 of the blade 76 and thus force both of the blades 75 and 76 downward causing the tongue 78 to be engaged by the detent 79, and this holds the timer circuit and its blades to provide electrical energy from line L to the refrigerator line 90 to provide refrigeration throughout the normal refrigerating period.

When the defrost period begins, as indicated in Figure 10, the notch 53 permits the follower 54 to rise upwardly, allowing the upwardly biased blade 56 to engage the contact 81 of the blade 75 and to urge the blades 75 and 76 upwardly, in readiness to snap upwardly when permitted to do so as later described. In the position of Figure 10, refrigeration is stopped by the opening of contacts 57 and 80, and defrosting is produced by the closing of contacts 57 and 81, which energize the defrost heater 40 from line L through contacts 57, 81, blade 75, line 75a, heater 40 and line L$_1$.

Figure 9 shows the termination of the defrost period and start of the refrigerating action. To this end, when all of the frost has been melted, the heater 40 is deenergized and the refrigeration cycle is started even if notch 53 is still engaging the follower 54, because the temperature of the evaporator 22 rises under the heating action of the heater 40 as soon as the frost is completely melted. The thermostatic bulb 70 then acts on the bellows 71 to move the pin 82 rightward in Figure 9 and upward in Figure 4 and to rotate the lever 72 clockwise about the fulcrum 73 against the action of spring 83. This releases the tongue 78 from the detent 79 (from the position of Figure 10) and allows the blades 75 and 76 to move upward to the position shown in Figure 9 where the double contacts 57 engage the contact 80 of the blade 76 to establish refrigerating conditions by energizing the air circulating motors 60 and permitting operation of the motor compressor unit 23 through the medium of thermostatic switch 63 and starting relay 85. The action taking place in Figure 9 changes the defrost period which had previously been established, as in Figure 10, to a refrigeration period during the unexpired portion of the timed defrost period produced by the notch 53. When the timer cam 51 rotates beyond the engagement of the notch 53 and enters into the smooth portion 52 of the cam as shown in Figure 11, the regular refrigeration cycle is resumed as previously described with respect to Figure 11.

During the defrosting operation, any moisture melted from the evaporator falls to the bottom of conduit 35 and flows through the pipe 86 to the pan 87 immediately over the condenser 24, where the moisture is evaporated. Any moisture which is condensed on the cold walls of the compartment 21 falls to the sloping bottom 88 of compartment 21, and flows through the pipe 89 to the pan 87 also to be evaporated therein.

If desired, one or more covered ice "cube" trays 95 may be placed in below freezing compartment 20, and in the corresponding below freezing compartments of the modifications herein disclosed, for freezing the water and preventing evaporation or sublimation from the tray. Such ice tray may be of the character disclosed in U. S. patent to Chase 2,629,987, patented March 3, 1953. The door switch 97, of usual construction, prevents operation of motors 60 and blowers 30 when the door 96 is open. This reduces circulation of humid air within the refrigerator.

In the operation of the refrigerator disclosed in Figures 1 through 12, the motor compressor 23 ordinarily is cycled under the control of thermostat 61, 62, 63, with the timer in the position shown in Figure 11. Power flows from the line L to the blade 56 and thence to the blade 76 to the line 90 from which current flows through the switch 63 (Figure 9) and starting relay 85 to the motor compressor 23, which operates in the usual manner to maintain the evaporator 22 within predetermined limits established by the thermostat bulb 61. At the same time, the line 90 energizes the blower motors 60 to cause circulation of air through the conduits 31 through 35. When the door 96, of compartment 20, is open, the blower motors 60 are temporarily stopped by the opening of the usual type door switch 97 to prevent operation of blowers 30 during this time. The air flowing down through conduit 35 is refrigerated to a temperature below that maintained in compartment 20 and thus has its moisture content reduced to a frost depositing temperature below that of compartment 20. So, when the air circulates into the compartment 20, it does not deposit any frost therein, but at the same time maintains the compartment below a freezing temperature, since the air flows around the compartment 20 and through it, and then returns through the down flow conduit 35. The air is sufficiently cold to refrigerate the compartment 21 to the proper degree through the thermal exchange of the wall 36 as varied by the action of baffle 45 to maintain the temperature of compartment 21 above freezing, but at the suitable refrigerating temperature established by the thermostat 47. This operation continues as long as the smooth circumference 52 of the timer cam 51 establishes a refrigerating period as shown in Figure 11.

When the timer establishes a defrosting period as shown in Figure 10, the notch 53 allows the follower 54 to rise and permit the blade 56 to move and bias the blades 75 and 76 upward. During the defrost operation as shown in Figure 10, current flows from the line L through the blades 56 and 75 and line 75a to the defrost heater 40 so that the evaporator 22 is heated to a defrosting temperature.

When substantially all of the frost has been removed from the evaporator 22, it is heated to a predetermined high temperature. The thermostat 70, 71 and 72 then rotates the lever 72 clockwise to the position shown in Figure 9, at which time the defrost switch position is changed into a refrigerating position during the unexpired portion of the timed defrost period. Refrigeration is produced by current flowing from L through contacts 80 and 57 to the compressor 23 and blowers 60, through line 90.

The compartment 20 is maintained at a below freezing temperature and the compartment 21 is maintained at a predetermined refrigerating, above freezing, temperature without the formation of frost within the compartment 20 or on the food contained therein. Any moisture condensed on the rear wall of compartment 21 flows down such wall and is discharged through pipe 89 as previously described. Thus, a completely automatic defrosting refrigerator is provided.

Figure 13:
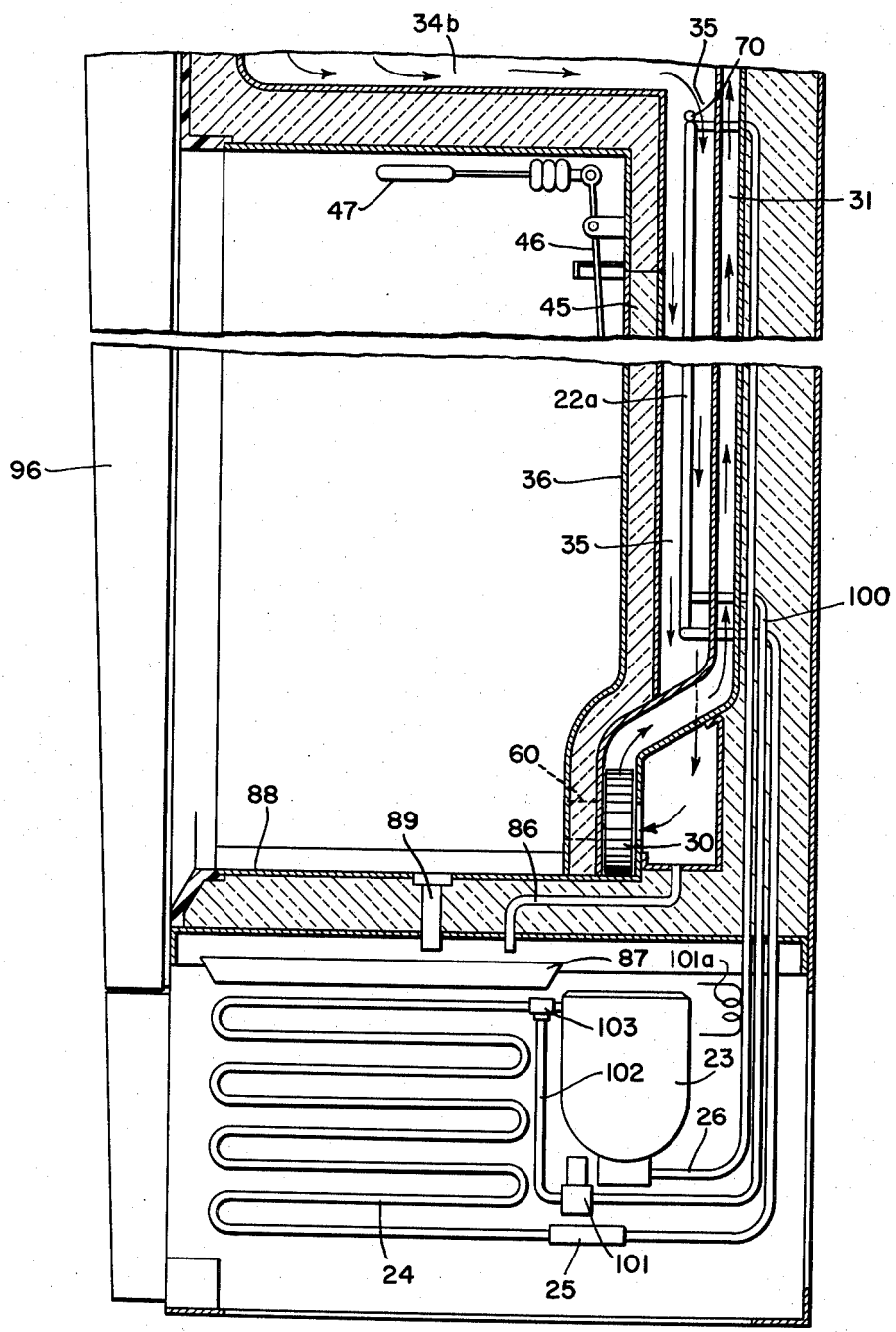
Figure 13 is a modification of the embodiment of Figures 1, etc., in which hot gas is used for defrosting.
Figure 14:
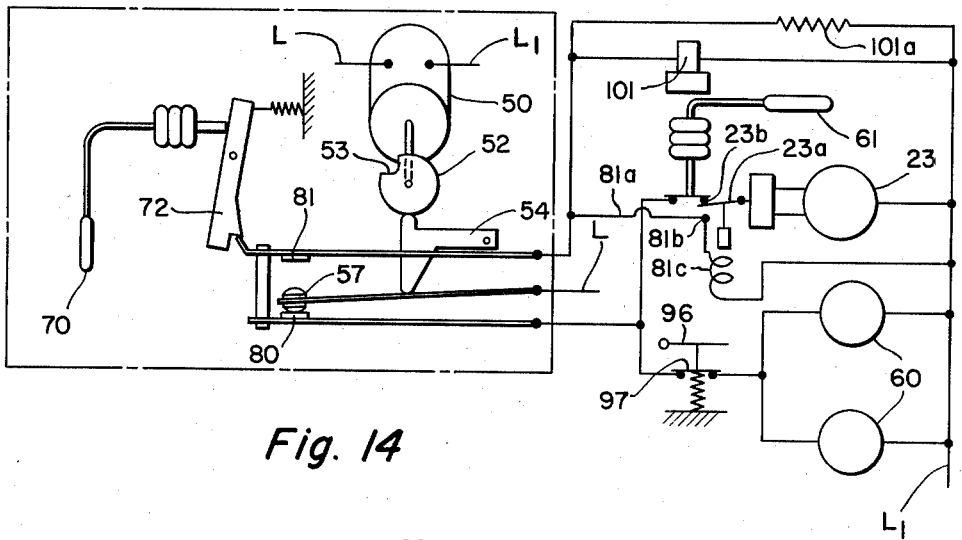
Figure 14 is a wiring diagram for the system shown in Figure 13.

In the modifications shown in Figures 13 and 14, the parts which have been numbered with the same numerals used in Figures 1 through 12 operate in substantially the same manner as described with respect to Figures 1 through 12.

In the modifications shown in Figures 13 and 14, defrosting is accomplished by using a hot refrigerant, such as hot gas or hot liquid refrigerant as a source of heat instead of electric heaters as used in the previous embodiment. To this end, the evaporator 22a has been modified, so that hot gas or hot liquid refrigerant may be introduced into the evaporator 22a through the pipe 100. The pipe 100 is provided with a solenoid valve 101 and is connected by the pipe 102 at some point 103 with the condenser 24 or with the connection between compressor 23 and the condenser 24. Otherwise, the construction is substantially as described with respect to Figures 1 through 12, but the wiring is changed as indicated in Figure 14, which shows the wiring system during the refrigerating cycle. It is understood that the timer is substantially as disclosed in Figures 9, 10 and 11, and that the thermostat 70 strips the lever 72 substantially as previously described. During the refrigerating cycle, corresponding to Figure 11, the compressor 23 and the blower motors 60 operate, as long as the door 96 is closed. The blower motors 60 stop temporarily when the door 96 is opened. The compressor 23 is controlled by the thermostat bulb 61 to maintain the evaporator 22a at the desired temperature during the refrigeration cycle. When the timer cam 52 reaches the defrost position corresponding to Figure 10, then the solenoid valve 101 is energized and the compressor 23 and blower motors 60 are stopped, since the contact 57 has been moved up against contact 81. Under these conditions, hot gas and/or liquid refrigerant pass through the pipe 102, valve 101 and pipe 100 into the evaporator 22a, and the heat so transferred defrosts the evaporator. When the evaporator 22a becomes defrosted, the thermostat bulb 70 trips the lever 72 as previously described with respect to Figure 9, and the refrigeration cycle is restored, even before the notch 53 moves away from the lever 54. If desired, the compressor 23 may be operated during the defrost cycle.

Figure 17:
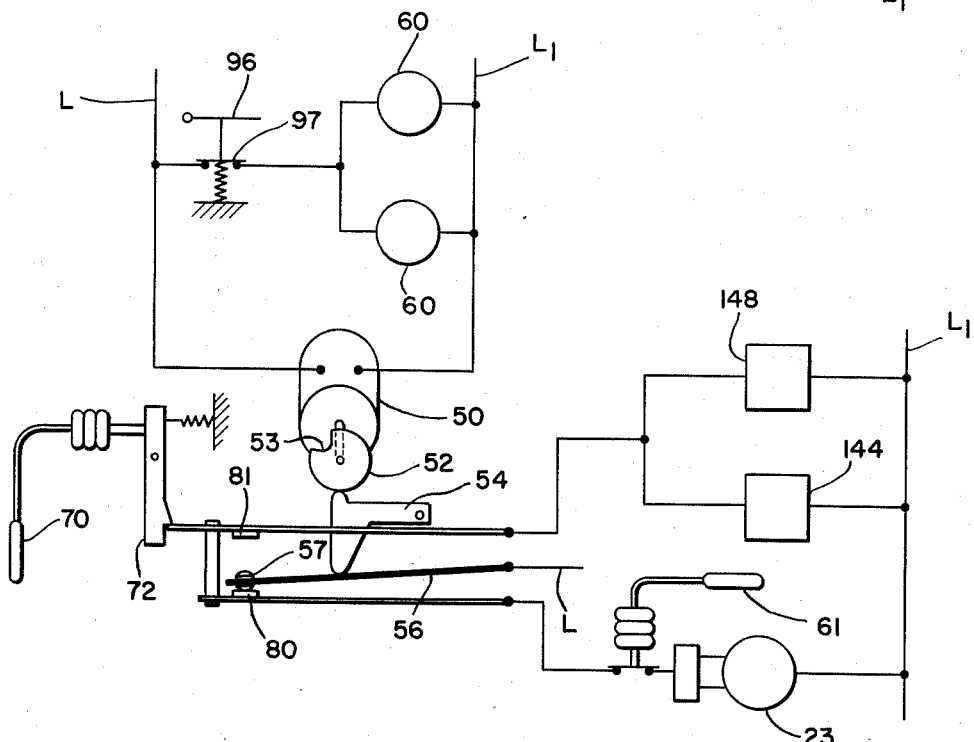
Figure 17 is a wiring diagram for the system of Figure 15.
Figure 15:
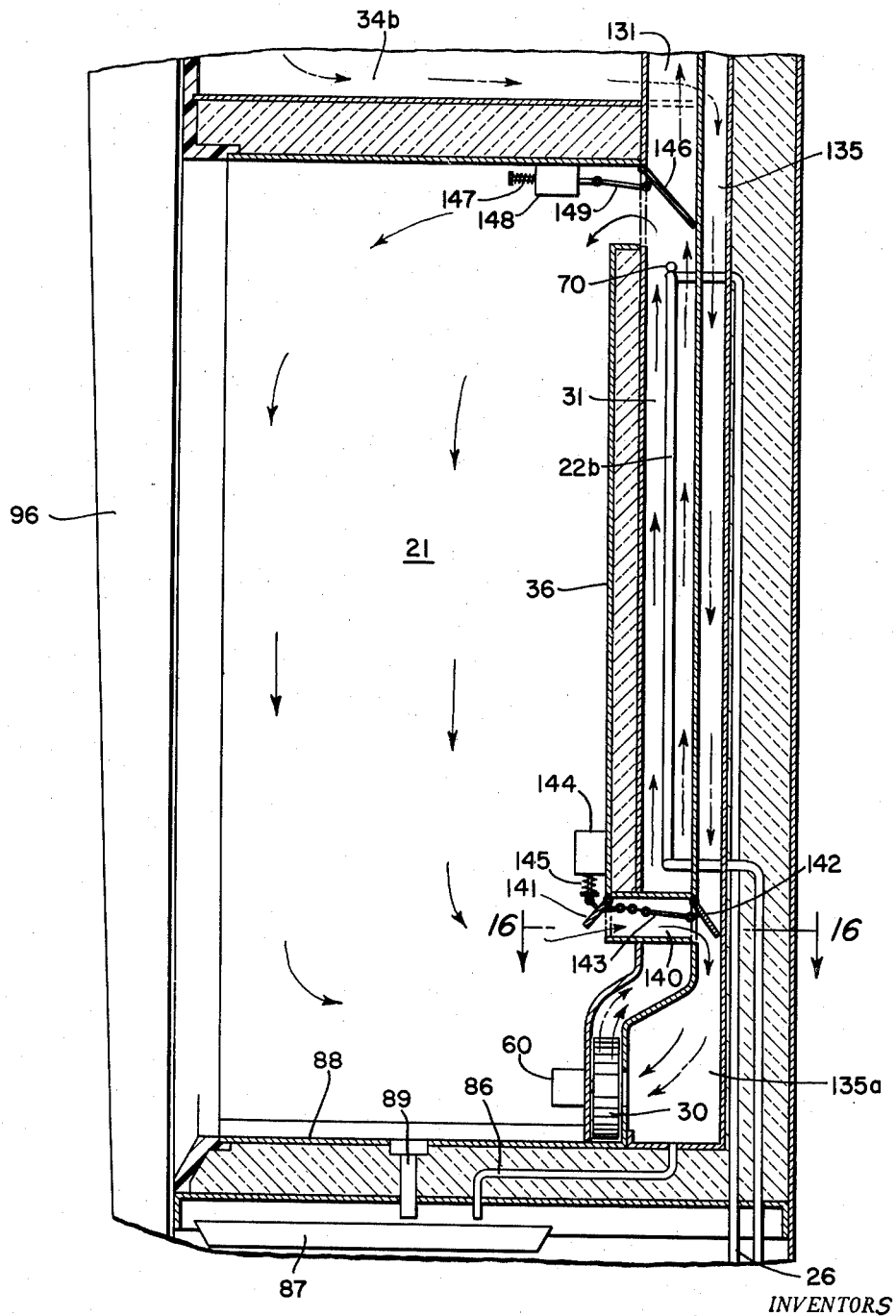
Figure 15 is a modification of the embodiment of Figures 1, etc., in which the heat from the above freezing compartment is used for defrosting purposes.
Figure 16:
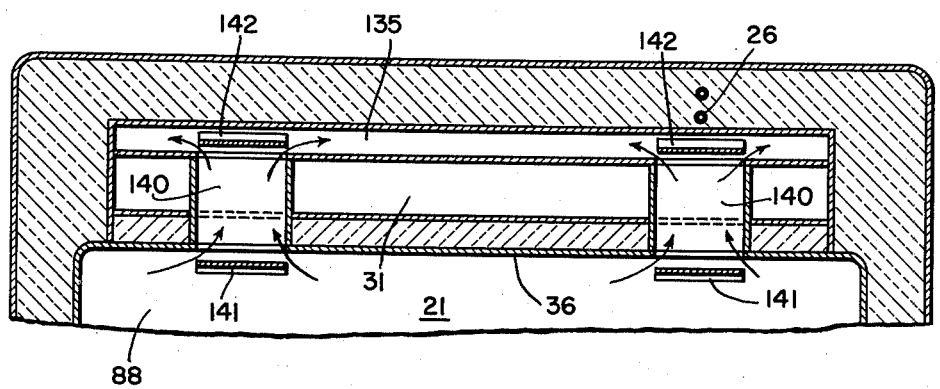
Figure 16 is a cross-section along line 16—16 of Figure 15.

In the modification shown in Figures 15, 16 and 17, defrosting is accomplished by utilizing the above freezing heat stored in the compartment 21. In this modification, those parts which correspond with Figures 1 through 12 have been similarly numbered, and operate substantially the same, with the exception that they have been modified as will now be apparent. The evaporator 22b is not provided with the electric heater of Figures 1 through 12 nor with the hot gas connection of Figures 13 and 14. Instead, the evaporator 22b is connected to the compressor and condenser substantially as disclosed in Figures 1 through 12 and particularly in the bottom portion of Figure 1, with the electric heater omitted. The passageway 31, which carries the cold air to the below freezing compartment 20 is placed adjacent the wall 36, and is connected by the passageway 131 with the serpentine conduits 32 (Figure 12) which surround the compartment 20 shown in the previous figures. The returning air from compartment 20, which has passed through openings 34 of Figures 1 through 12 returns through passageway 34b into passageway 135 which leads downwardly into the intakes of the blowers 30. Under these conditions, air flows up through passageway 31 where it is cooled by evaporator 22b and then flows through passageway 131 to the serpentine conduits 32 heretofore described with respect to Figures 1 through 12. The air returning through openings 34 of said figures returns through passageway 34b and passageway 135 back to the blowers 30.

Means are provided for transferring heat from compartment 21 to evaporator 22b during the defrost period. To this end a passageway 140 connects the compartment 21 with the passageway 135 and flow of air therethrough is controlled by the dampers 141 and 142 which are opened and closed by linkage 143 under the control of solenoid 144. When the solenoid 144 is energized, the dampers 141 and 142 are opened whereas when the solenoid 144 is deenergized these dampers are closed by the compression spring 145. Another damper 146 is normally closed under the action of compression spring 147 but is opened when the solenoid 148 is energized, and moves the damper 148 into open position through the linkage 149.

Figure 17 shows the wiring diagram for Figures 15 and 16, and causes the blowers 30 and their motors 60 to operate all of the time that the refrigerator is plugged in, or during the time that its master switch, not shown, is closed, with the exception that when the door 96 is opened, its door switch 97 likewise is opened and stops the blower motors. When the timer has its cam 52 in refrigeration position corresponding to Figure 17, and as shown in Figure 17, the blade 56 energizes the compressor 23 under the control of thermostat bulb 61 substantially as previously described with respect to Figures 9, 10 and 11, but the blower motors 60 in Figure 17 are not under the control of the timer but are across lines L and L₁ only under the control of the door switch.

The timer motor 50 also is independently across the lines L—L₁. When the timer reaches the defrost position corresponding to Figure 10, the blade 56 moves up and closes contacts 57 and 81, as in Figure 10, which deenergizes the compressor 23 and energizes the solenoids 144 and 148. Under these conditions, refrigerant is not fed to the evaporator 22b but relatively warm air flows from compartment 21 through passageway 140 to the lower part 135a of passageway 135 from whence the warm air passes into the blowers 30 and up past the evaporator 22b warming and defrosting the same and the air then returns through the opening produced by the movement of damper 146 to the open position, at the same time preventing the flow of any warm air into and around compartment 20. This action continues until such time as the thermostat 70 is warmed by the completion of the defrosting operation, at which time the thermostat 70 trips the lever 72 placing the timer in the position corresponding to Figure 9 which deenergizes the solenoids 144 and 148 and cycles the compressor 23 under the control of thermostat 61, also closing the dampers 141, 142 and 146 and restoring the refrigeration cycle in a manner corresponding to that described with respect to Figures 9 and 11.

The operation of the modification shown in Figures 13 through 17 is believed obvious from the foregoing description of the modifications taken in conjunction with the description of the operation of Figures 1 through 12.

Figure 18:
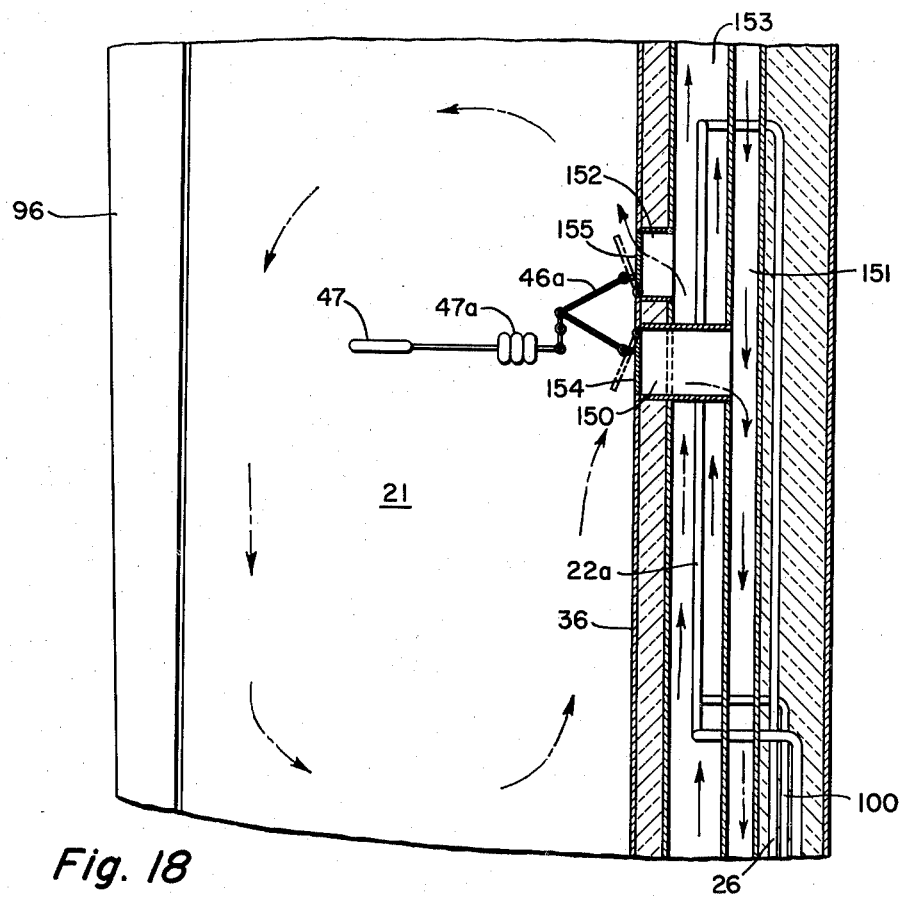
Figure 18 is a thermostatic damper control which may be used with any of the embodiments of the previous figures.

Figure 18 shows a damper control which may be substituted for the damper 45 of Figures 1 through 14 and which may be added to Figures 15 through 17. To this end, a passageway 150 connects the compartment 21 with the returning air passageway 151. Another passageway 152 connects the compartment 21 with the upflowing cold air passageway 153. Passageways 151 and 153 may correspond to the various passageways heretofore described in Figures 1 through 17. A pair of dampers 154 and 155 control the passageways 150 and 152 and are controlled by thermostat 47 through the medium of bellows 47a and linkage 46a, so that the dampers 154 and 155 are opened more and more as the thermostat 47 gets warmer and vice versa. Under these conditions, as the temperature rises in compartment 21, the dampers 154 and 155 are opened more to supply more and more cold air and to withdraw warm air from the compartment 21, and vice versa.

This application is a continuation-in-part of our copending application Serial No. 527,290, filed August 9, 1955, which issued on May 21, 1957, as Patent No. 2,792,691.

If it is desired to operate the compressor 23 during the defrost period without operating the blowers in the embodiment of Figures 12 through 14, an electric line 81a may lead to the contact 81b and from thence to the solenoid 81c and to L₁. The upwardly biased switch blade 23a is pulled from contact 23b to contact 81b by solenoid 81c whenever the defrost electric line is energized at contact 81. Under these conditions the compressor 23 operates when the hot refrigerant solenoid valve 101 is energized and opened. This insures a continued supply of hot refrigerant. The blower motors 60 are not energized during the defrost period because of the break in circuit at 23b. If desired, an electric heater 101a may be provided at any suitable place in the refrigerant system, such as the return refrigerant line 26 (Figures 13 and 14) to add heat to the refrigerant during the defrost period.

The timer for all of the embodiments may be of the type disclosed in Figures 1 through 12 or it may be of the type which does not thermostatically terminate the defrost period, in which case the thermostat 70 and member 72 may be omitted and contacts 80 and 81 may be made substantially rigid.

While the form of embodiment of the invention as herein disclosed constitutes a preferred form, it is to be understood that other forms might be adopted as may come within the scope of the claims which follow.

What is claimed is as follows:

1. In combination, a below freezing compartment; a refrigerating above freezing compartment; a refrigeration system including an evaporator and refrigerant liquefier in refrigerant circulating relationship; air circulating means; air conduit means extending from said below freezing compartment first to said evaporator and thence to said below and above freezing compartments for circulating air from said air circulating means first into thermal exchange with said evaporator, thence into said below freezing compartment and adjacent and outside of but in thermal exchange with said above freezing compartment; defrosting means for defrosting said evaporator; means for adjustably bleeding refrigerated air from said air conduit means into said refrigerating above freezing compartment to regulate the temperature in said above freezing compartment; and a controller establishing a defrost period for operation of said defrosting means and a refrigerating period for establishing a refrigeration maintaining condition of said refrigerating system.

2. A household refrigerator including a cabinet provided with a first box shaped liner enclosing a freezing compartment, heat insulation surrounding said liner, an insulated door for said liner, a second box shaped liner enclosing a food compartment, said liners being located one above the other, said cabinet being provided with air passages adjacent the outsides of said first and second liners and recirculating air passages, said first liner having means for receiving air within its interior from one portion of the air passages and for delivering the air to another portion of the air passages, a refrigerating system comprising liquefying means and an evaporating means located in heat transfer relationship with one of said air passages, means for circulating air through said air passages and in heat transfer relationship with said evaporating means and thence through the interior of said first liner, and means responsive to the temperature within said second liner for controlling the movement of air between said air passages and the interior of said second liner.

3. A household refrigerator including a cabinet provided with a first box shaped liner enclosing a freezing compartment, heat insulation surrounding said liner, an insulated door for said liner, a second box shaped liner enclosing a food compartment, said liners being located one above the other, said cabinet being provided with air passages adjacent the outsides of said first and second liners and recirculating air passages, said first liner having means for receiving air within its interior from one portion of the air passages and for delivering the air to another portion of the air passages, a refrigerating system comprising liquefying means and an evaporating means located in heat transfer relationship with one of said air passages, means for circulating air through said air passages and in heat transfer relationship with said evaporating means and thence through the interior of said first liner, and means responsive to the temperature within said second liner for controlling the movement of air between said air passages and the interior of said second liner, and insulating means between said second liner and said air passages.

4. A household refrigerator including a cabinet provided with a first box shaped liner enclosing a freezing compartment, heat insulation surrounding said liner, an insulated door for said liner, a second box shaped liner enclosing a food compartment, said liners being located one above the other, said cabinet being provided with air passages adjacent the outsides of said first and second liners and recirculating air passages, said first liner having means for receiving air within its interior from one portion of the air passages and for delivering the air to another portion of the air passages, a refrigerating system comprising liquefying means and an evaporating means located in heat transfer relationship with one of said air passages, means for circulating air through said air passages and in heat transfer relationship with said evaporating means and thence through the interior of said first liner and said second liner, said second liner having an opening communicating with said air passages, and a thermostatically controlled valve for controlling the flow of air through said opening in said second liner.

5. A household refrigerator including an insulated cabinet containing a first box shaped liner enclosing a freezing compartment and providing a door opening, a second box shaped liner enclosing a food compartment and providing a second door opening, said liners being located one above the other within the insulated cabinet, insulated door means for the door openings of said compartments, a refrigerating system including liquefying means and evaporating means located within said cabinet, said first liner having a first set of apertures adjacent its door opening and a rearwardly located aperture, said cabinet having air passage means extending from said first set of apertures to said evaporating means and thence to said rearwardly located aperture, means for circulating air from said first set of apertures through said air passage means in heat exchange relation with said evaporating means and through said rearwardly located aperture into said first liner for passage through said first liner to said first set of apertures.

6. A household refrigerator including an insulated cabinet containing a first box shaped liner enclosing a freezing compartment and providing a door opening, a second box shaped liner enclosing a food compartment and providing a second door opening, said liners being located one above the other within the insulated cabinet, insulated door means for the door openings of said compartments, a refrigerating system including liquefying means and evaporating means located within said cabinet, said first liner having a first set of apertures adjacent it door opening and a rearwardly located aperture, said cabinet having air passage means extending from said first set of apertures to said evaporating means and thence to said rearwardly located aperture, means for circulating air from said first set of apertures through said air passage means in heat exchange relation with said evaporating means and through said rearwardly located aperture into said first liner, said second liner having inlet and outlet apertures for passage through said first liner to said first set of apertures, and air passage means connecting with said inlet and outlet apertures for conducting cooled air into said second liner.

7. A refrigerator including an insulated cabinet containing a box shaped liner enclosing a freezing compartment and providing a front door opening and having a second opening adjacent the rear of said liner, a door for said door opening, a refrigerating system including liquefying means and evaporating means located within said cabinet, said cabinet having air passage means having an inlet located adjacent said door and door opening communicating with the interior of said liner directly adjacent said door, said air passage means having one portion extending from said inlet to said evaporating means and having a second portion extending from said evaporating means to said second opening and discharging into the interior of said liner, and air circulating means for said passage means for drawing air from the interior of said liner through said inlet and air passage means into heat exchange relation with said evaporating means and returning the air to the interior of said liner through said second portion and said second opening for passage through the liner.

References Cited in the file of this patent

UNITED STATES PATENTS

| | | |
|---|---|---|
| 1,979,638 | Philip | Nov. 6, 1934 |
| 2,124,268 | Williams | July 19, 1938 |
| 2,126,285 | Schaaf | Aug. 9, 1938 |
| 2,281,770 | Hoesel | May 5, 1942 |
| 2,285,946 | Kalischer | June 9, 1942 |
| 2,440,628 | Bauman | Apr. 27, 1948 |
| 2,451,903 | Bauman | Oct. 19, 1948 |
| 2,462,279 | Passman | Feb. 22, 1949 |
| 2,467,427 | Green | Apr. 19, 1949 |
| 2,543,494 | Hartman | Feb. 27, 1951 |
| 2,546,363 | Jaeger | Mar. 27, 1951 |
| 2,662,380 | Sutton | Dec. 15, 1953 |